(12) United States Patent
Qin et al.

(10) Patent No.: US 9,791,725 B2
(45) Date of Patent: Oct. 17, 2017

(54) METHOD AND SYSTEM FOR REPAIRING DEFECTIVE PIXEL, AND DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Wei Qin, Beijing (CN); Yuxin Deng, Beijing (CN); Manping Niu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/429,885

(22) PCT Filed: Jul. 18, 2014

(86) PCT No.: PCT/CN2014/082564
§ 371 (c)(1),
(2) Date: Mar. 20, 2015

(87) PCT Pub. No.: WO2015/090060
PCT Pub. Date: Jun. 25, 2015

(65) Prior Publication Data
US 2016/0033796 A1 Feb. 4, 2016

(30) Foreign Application Priority Data

Dec. 18, 2013 (CN) .......................... 2013 1 0700535

(51) Int. Cl.
*G02F 1/13* (2006.01)
*G02F 1/1362* (2006.01)

(52) U.S. Cl.
CPC ...... *G02F 1/1309* (2013.01); *G02F 1/136259* (2013.01)

(58) Field of Classification Search
CPC .......................... G02F 1/1309; G02F 1/136259
See application file for complete search history.

(56) References Cited

U.S. PATENT DOCUMENTS

| | | | | |
|---|---|---|---|---|
| 4,320,292 A | * | 3/1982 | Oikawa | .................. G06F 3/042 |
| | | | | 250/221 |
| 5,243,332 A | * | 9/1993 | Jacobson | .............. G06F 3/0412 |
| | | | | 250/208.1 |

(Continued)

FOREIGN PATENT DOCUMENTS

| CN | 102202226 A | 9/2011 |
|---|---|---|
| CN | 102629043 A | 8/2012 |

(Continued)

OTHER PUBLICATIONS

Chinese Office Action Appln. No. 201310700535.5; dated Nov. 4, 2015.

(Continued)

*Primary Examiner* — Sang V Nguyen
(74) *Attorney, Agent, or Firm* — Ladas & Parry LLP (57) ABSTRACT

A method and a system for repairing a defective pixel, and a display panel are provided, the method including: positioning a center of the defective pixel to obtain a center coordinate of the defective pixel; and repairing the defective pixel according to the center coordinate. By the method, the conventional manual alignment operation is replaced with the automatic positioning of the center coordinate, which not only accelerates repairing of the defective pixel, but also improves repairing efficiency, enhances overall efficiency and productivity of the device, and meanwhile, can solve the problem of unsuccessful repairing due to error in manual (Continued)

operation; and the accuracy of the repairing can be improved by automatically positioning the center.

9 Claims, 6 Drawing Sheets

(56) References Cited

U.S. PATENT DOCUMENTS

| | | | | |
|---|---|---|---|---|
| 5,420,703 | A * | 5/1995 | Sakai | H04N 1/32358 358/1.17 |
| 6,035,526 | A * | 3/2000 | Saruta | G02B 5/201 219/121.13 |
| 2001/0038065 | A1* | 11/2001 | Kimura | H01L 27/14645 250/208.1 |
| 2002/0122123 | A1* | 9/2002 | Kimura | H04N 9/30 348/246 |
| 2009/0122110 | A1* | 5/2009 | Yoshioka | B41J 2/2139 347/44 |
| 2009/0141231 | A1* | 6/2009 | Lim | G02F 1/133512 349/192 |
| 2012/0077408 | A1* | 3/2012 | Tajima | G02F 1/1303 445/2 |
| 2016/0299365 | A1* | 10/2016 | Deng | G01N 21/00 |

FOREIGN PATENT DOCUMENTS

| | | | | |
|---|---|---|---|---|
| CN | 102654661 A | | 9/2012 | |
| CN | 103676236 A | | 3/2014 | |
| JP | 2007-086206 | * | 4/2006 | ............... G02B 5/00 |
| JP | 2006-323032 | * | 11/2006 | ............... G09F 9/00 |
| JP | 2006-323032 A | | 11/2006 | |
| JP | 2007-086206 | * | 4/2007 | ............... G02B 5/20 |
| JP | 2007-086206 A | | 4/2007 | |
| JP | 4704168 B2 | | 6/2011 | |
| JP | 2011-198179 | * | 10/2011 | ............... G06T 1/00 |

OTHER PUBLICATIONS

International Search Report Appln. No. PCT/CN2014/082564; dated Oct. 27, 2014.

Written Opinion of the International Searching Authority Appln. No. PCT/CN2014/082564; dated Oct. 27, 2014.

Third Chinese Office Action dated Jul. 6, 2016; Appln. No. 201310700535.5.

* cited by examiner

METHOD AND SYSTEM FOR REPAIRING DEFECTIVE PIXEL, AND DISPLAY PANEL

TECHNICAL FIELD

Embodiments of the present invention relate to a method for repairing a defective pixel, a system for repairing a defective pixel and a display panel obtained by the repairing.

BACKGROUND

In a fabrication process of a liquid crystal panel, due to a poor circuit, a dot defect and a line defect will be generated, and during manufacturing the liquid crystal panel, because dust, organic matters, metals and other impurities are adsorbed onto a region close to some color filters on the liquid crystal panel, pixels corresponding to these color filters will emit light much more brighter than the remaining normal pixels, which is referred to as a light leakage phenomenon, i.e., a bright-spot pixel defect.

For the bright-spot pixel defect, according to knowledge of the inventor, the pixel defect is repaired by using a repairing method of physical light shielding through crushing and diffusing a black matrix surrounding the pixel. The specific repairing method is that: an apparatus is positioned to a defective pixel, a worker manually aligns a laser for diffusing the black matrix precisely to a pixel region so as to perform laser irradiation, and the laser irradiates an alignment film so that the alignment film is damaged, in order to reduce light transmittance of liquid crystal by using a method of weakening arrangement characteristics of the liquid crystal, so as to eliminate the light leakage phenomenon, and brightness also may be adjusted in the repairing process while the laser irradiation is performed, so as to confirm a repairing effect.

However, a process of aligning the laser in the above-described method requires to align the laser precisely to the pixel region manually, and a process of adjusting the brightness requires to adjust the brightness manually, which cannot achieve automatic repairing of the defective pixel.

SUMMARY OF THE INVENTION

Embodiments of the present invention provide a method for repairing a defective pixel, a system for repairing a defective pixel and a display panel obtained by the repairing, which can achieve automatic repairing of the bright-spot pixel defect.

In one aspect, an embodiment of the present invention provides a method for repairing a defective pixel, comprising: positioning a center of the defective pixel to obtain a center coordinate of the defective pixel; and repairing the defective pixel according to the center coordinate.

In another aspect, an embodiment of the present invention further provides a system for repairing a defective pixel, comprising: a positioning-center unit, configured to position a center of the defective pixel to obtain a center coordinate of the defective pixel; and a repairing unit, configured to repair the defective pixel according to the center coordinate.

In still another aspect, an embodiment of the present invention further provides a display panel, which is the display panel obtained by the repairing with the above-described method for repairing a defective pixel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, embodiments of the present invention will be further illustrated in detail in conjunction with the accompanying drawings. The embodiments below are only exemplary, which are not intended to limit the protection scope of the embodiments of the present invention.

A First Embodiment

The first embodiment of the present invention provides a method for repairing a defective pixel, comprising steps of:

Step S1: positioning a center of the defective pixel to obtain a center coordinate of the defective pixel;

Step S2: repairing the defective pixel according to the center coordinate.

Based on the above-described method for repairing the defective pixel, by positioned the center of the defective pixel, not only a pixel region is positioned, but also the center of the defective pixel is precisely positioned; and then by repairing the defective pixel according to the center coordinate, it is not necessary to precisely position the defective pixel to be repaired manually, so that speed and accuracy of the repairing can be improved.

It should be noted that the center coordinate obtained may have a certain deviation in an allowable range, that is, the center coordinate obtained may have a certain deviation from the precise center coordinate, but the deviation is within the allowable range. Further, if the pixel region is of an irregular shape, then the center coordinate is just the approximate center coordinate of the pixel region, which will not be limited by an embodiment of the present invention, and which can be determined according to specific situations; and if the pixel region is of a regular shape, for example, a square, the center coordinate obtained here is the precise center coordinate.

Alternatively, in the step S1, before positioning a center of the defective pixel to obtain a center coordinate of the defective pixel, the method further comprises: positioning the defective pixel to obtain a pixel coordinate of the defective pixel, wherein the pixel coordinate and the center coordinate obtained do not coincide. For a certain defective pixel, with the defective pixel in FIG. 1 as an example, a center coordinate of a lens picture is shown by a cross-shaped mark in FIG. 1, that is, a center of the lens picture is aligned with one pixel coordinate within the pixel region where the defective pixel is located, but is not located in a central position of the pixel region; and it can also be seen from FIG. 1 that the pixel coordinate Add (X,Y) of the pixel region is located in a center-right position. When the defective pixel is repaired, the lens is moved to the pixel region where the defective pixel is located only by being aligned to the pixel coordinate of the defective pixel, and the precision of movement is ensures only within a range of the pixel region; but in the repairing process, it is still necessary to precisely position the center of the pixel region in advance, i.e., to find the center coordinate, which is located on a center point of the defective pixel.

Further, in the embodiment, after the pixel coordinate of the defective pixel is obtained, the positioning the center of the defective pixel comprises:

Performing a scanning, with the pixel coordinate as a center, respectively in four directions of upward, downward, leftward and rightward, until an upper edge, a lower edge, a left edge and a right edge of the defective pixel are scanned, to obtain an upper edge coordinate, a lower edge coordinate, a left edge coordinate and a right edge coordinate;

Calculating a vertical coordinate of the center coordinate according to the upper edge coordinate and the lower edge coordinate, and calculating a horizontal coordinate of the center coordinate according to the left edge coordinate and the right edge coordinate, so as to obtain the center coordinate.

Alternatively, the above-described obtaining an upper edge coordinate, a lower edge coordinate, a left edge coordinate and a right edge coordinate, comprises: performing a scanning, from the pixel coordinate, respectively in four directions of upward, downward, leftward and rightward, and then determining, when gray-scale values corresponding to coordinates are found changed by scanning, the coordinates at which four gray-scale values are changed respectively as the upper edge coordinate, the lower edge coordinate, the left edge coordinate and the right edge coordinate.

Figure 1:
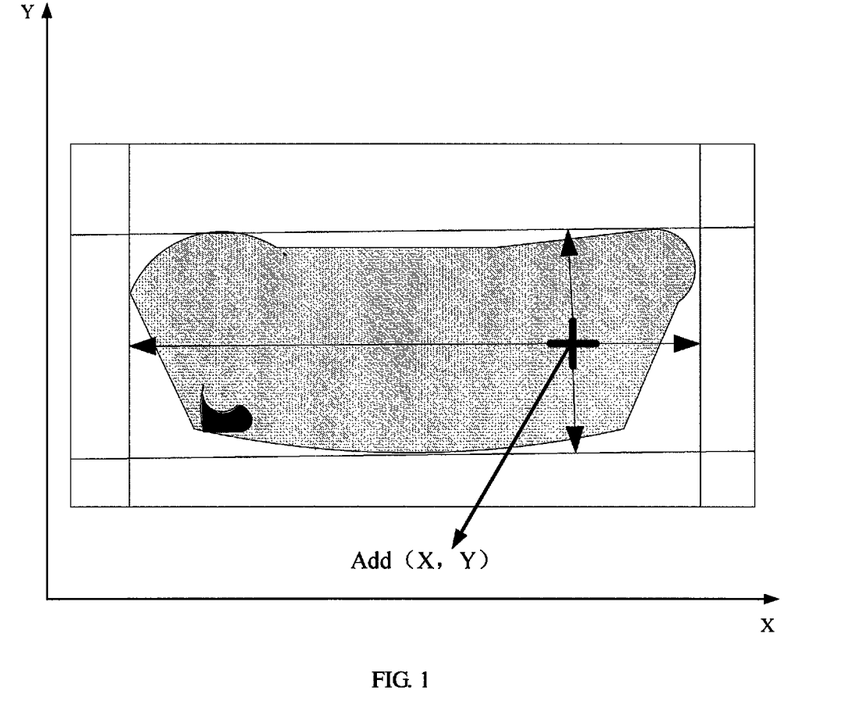
FIG. 1 is positioning of a pixel coordinate for a defective pixel according to a first embodiment of the present invention.

Still with FIG. 1 as an example, the center of the lens picture is not in the center of the defective pixel region, the coordinate (i.e. the pixel coordinate) is Add (X, Y), scanning is started upward according to a color of a target pixel (with green as an example in the embodiment), until the upper edge of the pixel region is reached, because regions except the pixel region are all covered by a black matrix, the gray-scale value will change from an original green gray-scale value to a black gray-scale value, whereby the upper edge of the defective pixel region is determined, i.e., the upper edge coordinate obtained by scanning upward along the pixel coordinate Add (X, Y) is Offset U. Likewise, the edge coordinates in the other three directions are determined, by scanning downward, until the lower edge of the defective pixel region is scanned, to obtain the lower edge coordinate Offset D; by scanning leftward, until the left edge of the defective pixel region is scanned, to obtain the left edge coordinate Offset L; and by scanning rightward, until the right edge of the defective pixel region is scanned, to obtain the right edge coordinate Offset R. After the edge coordinates in the four directions are determined, the vertical coordinate of the center coordinate is calculated by averaging the upper edge coordinate Offset U and the lower edge coordinate Offset D, and the horizontal coordinate of the center coordinate is calculated by averaging the left edge coordinate Offset L and the right edge coordinate Offset R, so as to obtain the center coordinate Offset (X, Y), so Offset (X, Y)=Offset ((Offset L+Offset R)/2, (Offset U+Offset D)/2).

Exemplarily, the performing a scanning, with the pixel coordinate as the center, respectively upward and downward refers to scanning, with the pixel coordinate as the center, upward and downward along a Y-axis direction, in a case where a X coordinate remains unchanged, and the performing a scanning, with the pixel coordinate as the center, respectively leftward and rightward refers to scanning, with the pixel coordinate as the center, leftward and rightward along an X-axis direction, in a case where a Y coordinate remains unchanged.

Figure 2:
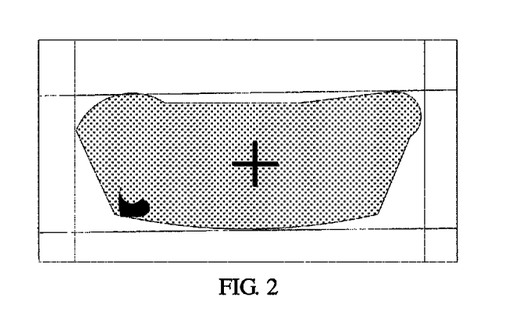
FIG. 2 is positioning of a center coordinate for a defective pixel according to a first embodiment of the present invention.

Furthermore, it should be noted that the pixel region shown in FIG. 2 is an irregular region, which is merely an example, and in fact, the pixel region may be determined according to an actual situation, for the irregular pixel region, the upper edge, the lower edge, the left edge and the right edge determined by scanning upward, downward, leftward and rightward with the pixel coordinate as the center may not be the uppermost edge, the lowermost edge, the leftmost edge and the rightmost edge of the pixel region, but the center coordinate determined thereby is still within the error allowable range. Moreover, if the pixel region is of a regular shape, e.g., a rectangle, then the upper edge, the lower edge, the left edge and the right edge determined above are just the uppermost edge, the lowermost edge, the leftmost edge and the rightmost edge of the pixel region, and the center coordinate determined thereby is just the precise center coordinate.

After the center coordinate of the defective pixel is determined, the lens is moved to a position of the center coordinate, as shown in FIG. 2, wherein a cross-shaped mark in FIG. 2 shows the position of the center coordinate of the pixel region. A laser is aligned with the center coordinate of the pixel region, the black matrix surrounding it is crushed and diffused, so as to achieve physical light shielding, and to achieve the repairing effect of the defective pixel.

Alternatively, the method for repairing the defective pixel according to the embodiment further comprise a step of monitoring a repairing result, comprising:

detecting brightness of the defective pixel region, before repairing the defective pixel according to the center coordinate, to obtain a preset brightness;

shielding an unrepaired pixel, after the defective pixel is repaired, so as to detect brightness of the repaired defective pixel and obtain a repairing brightness; and determining a repairing effect according to the preset brightness and the repairing brightness.

That is, it is necessary to compare the brightness of the defective pixel before and after the repairing, after the defective pixel is repaired, so as to determine whether a pixel coverage effect meets requirements or not. Exemplarily, a photosensitivity testing module is added in an black matrix (BM) diffusing repairing optical path, the preset brightness of the defective pixel region is detected to be S(cd/m2) before the repairing, the unrepaired pixel is shielded after the defective pixel is repaired, so that the brightness of the repaired defective pixel is detected, to obtain the repaired brightness as SA(cd/m2), and further, whether the repairing effect is qualified is monitored and determined according to S and SA and according to a standard of:

If S−SA≥d, the repairing is determined as qualified;

If S−SA<d, the repairing is determined as unqualified.

Herein d is a minimum value by which the brightness of the repaired pixel region with qualified coverage is reduced as compared with the brightness before the repairing, that is, a determination threshold, which may be a value approximate to 0, or any other value, which will not be limited by an embodiment of the present invention, but may be set according to experiments or needs.

Figure 3:
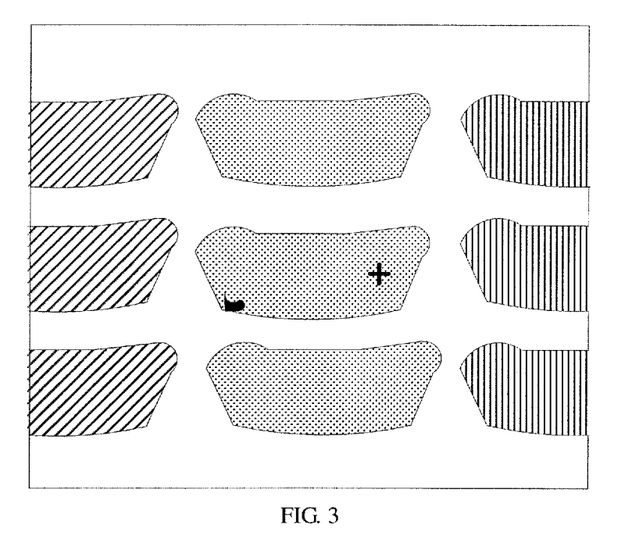
FIG. 3 is a schematic diagram when a lens is positioned at a pixel coordinate of a defective pixel according to a first embodiment of the present invention.

By taking repairing the defective pixel in FIG. 1 as an example, a repairing procedure of using the above-described repairing method is as follows:

1) Firstly, a lens is moved to the pixel region of the defective pixel and is positioned at the pixel coordinate Add (X, Y). As shown in FIG. 3, the lens is positioned at the pixel region where the defective pixel is located, i.e. positioned at the pixel coordinate. It is assumed that the defective pixel is located in a column where green pixels are located, a column to the left being of red pixels, and a column to the right being of blue pixels.

Figure 4:
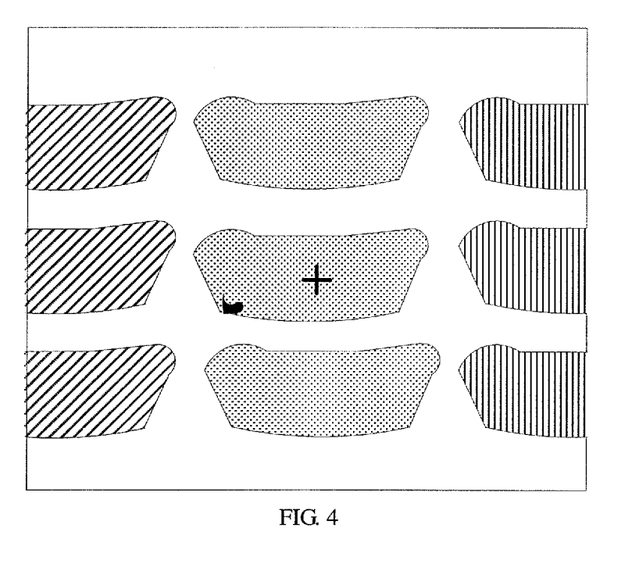
FIG. 4 is a schematic diagram when the lens is positioned at a center coordinate of the defective pixel according to the first embodiment of the present invention.
Figure 5:
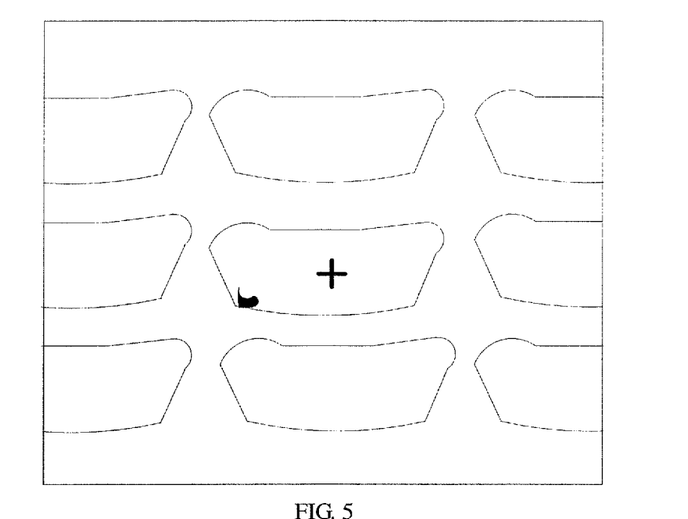
FIG. 5 is a schematic diagram after brightness is adjusted according to a first embodiment of the present invention.

2) Next, performing a scanning, with the pixel coordinate as the center, respectively in four directions of upward, downward, leftward and rightward, until the edge coordinates in the four directions are determined, and then calculating the center coordinate of the defective pixel according to the edge coordinates, and positioned the lens at the center inordinate of the defective pixel, as shown in FIG. 4.

Figure 6:
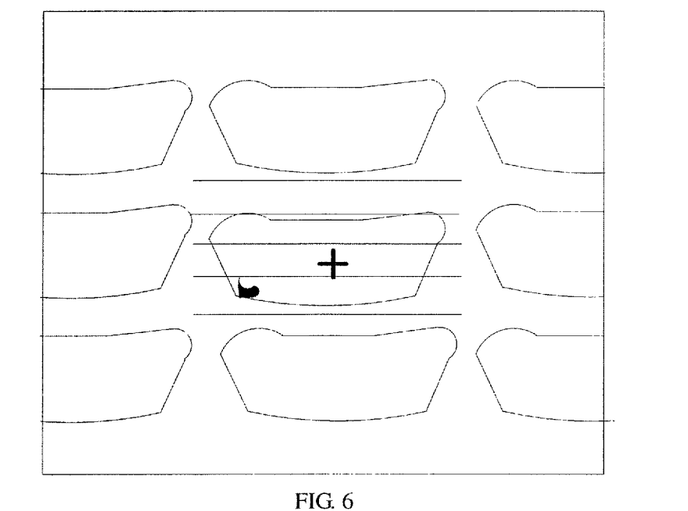
FIG. 6 is a schematic diagram of automatic laser repairing according to a first embodiment of the present invention.

3) A laser repairing apparatus may repair the defective pixel according to the center coordinate, after the center coordinate of the defective pixel is determined, and the schematic diagram of automatic laser repairing is shown in FIG. 6.

Figure 7:
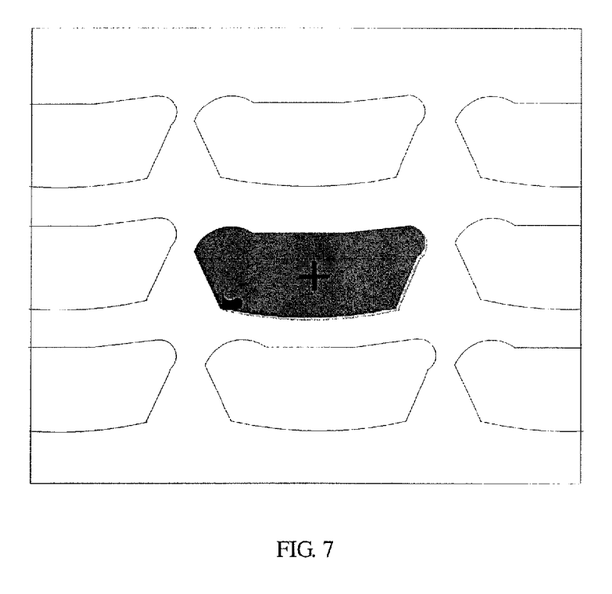
FIG. 7 is a schematic diagram of detecting a repairing effect according to a first embodiment of the present invention.

4) The repairing effect is detected after the repairing is completed; exemplarily, shielding the unrepaired pixel, so as to detect the brightness of the repaired defective pixel, to obtain the repaired brightness; and the repairing effect is determined, according to the preset brightness and the repaired brightness, wherein the preset brightness is obtained by detecting the brightness of the defective pixel before the repairing. The schematic diagram of detecting the repairing effect is shown in FIG. 7.

Therefore, by the method for repairing the defective pixel provided by the first embodiment, the center coordinate of the defective pixel on the display panel may be positioned, to achieve accurate positioning, and then the defective pixel is repaired according to the center coordinate obtained thereby, to replace the conventional manual alignment operation with the automatic positioning of the center coordinate, which not only accelerates repairing of the defective pixel, but also improves repairing efficiency, enhances overall efficiency and productivity of the apparatus, and meanwhile, can solve the problem of unsuccessful repairing due to error in manual operation; and the accuracy of the repairing can be improved by automatically positioning the center.

A Second Embodiment

Figure 8:
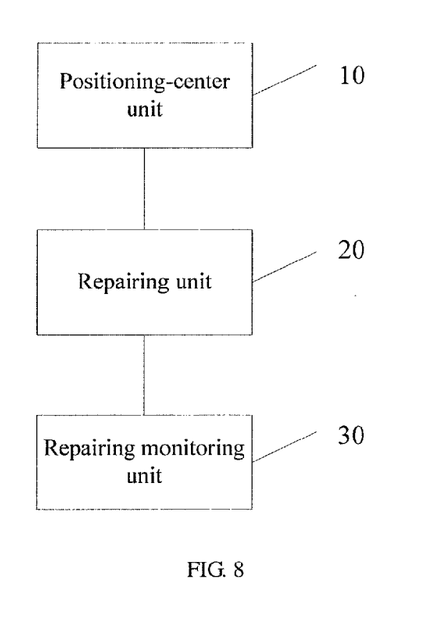
FIG. 8 is a constitute block diagram of a system for repairing a defective pixel provided by a second embodiment of the present invention.

The second embodiment of the present invention further provides a system for repairing a defective pixel, whose constitution block diagram is shown in FIG. 8, comprising:

a positioning-center unit 10, configured to position a center of the defective pixel to obtain a center coordinate of the defective pixel; and a repairing unit 20, configured to repair the defective pixel according to the center coordinate.

Figure 9:
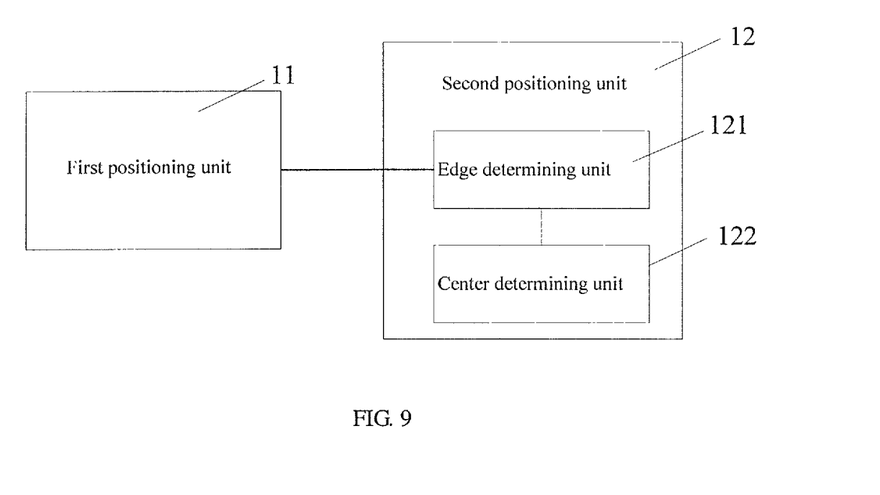
FIG. 9 is a constitute block diagram of a positioning-center unit provided by the second embodiment of the present invention.

Alternatively, a block diagram of the positioning-center unit 10 according to the embodiment is shown in FIG. 9, including a first positioning unit 11, for positioning the defective pixel to obtain a pixel coordinate of the defective pixel. Exemplarily, the positioning-center unit 10 further includes a second positioning unit 12, for further positioning the center of the defective pixel on the basis of the obtained pixel coordinate of the defective pixel to obtain in the center embodiment of the defective pixel, wherein the pixel coordinate and the center coordinate obtained do not coincide.

Alternatively, the second positioning unit 12 according to the embodiment includes:

an edge determining unit 121, configured to scan, with the pixel coordinate as a center, respectively upward, downward, leftward and rightward, until an upper edge, a lower edge, a left edge and a right edge of the defective pixel are scanned, to obtain an upper edge coordinate, a lower edge coordinate, a left edge coordinate and a right edge coordinate.

Exemplarily, the edge determining unit is used for scanning, from the pixel coordinate, respectively in the four directions of upward, downward, leftward and rightward, and then determining, when gray-scale values corresponding to coordinates are found change by scanning, the coordinates when four gray-scale values are changed respectively as the upper edge coordinate, the lower edge coordinate, the left edge coordinate and the right edge coordinate.

The second positioning unit 12 according to the embodiment further includes: a center determining unit 122, for calculating a vertical coordinate of the center coordinate according to the upper edge coordinate and the lower edge coordinate, and calculating a horizontal coordinate of the center coordinate according to the left edge coordinate and the right edge coordinate, so as to obtain the center coordinate. The method for calculating the center coordinate according to the upper edge coordinate, the lower edge coordinate, the left edge coordinate and the right edge coordinate is the same as the calculating method in the first embodiment, which will not be repeated here.

Further, after the center coordinate is found, the repairing unit 20 emits a laser according to an optimum brightness obtained, and irradiates the defective pixel, to crush and diffuse the black matrix in the defective pixel region, so as to achieve physical light shielding at the defective point, and to complete the repairing.

Figure 10:
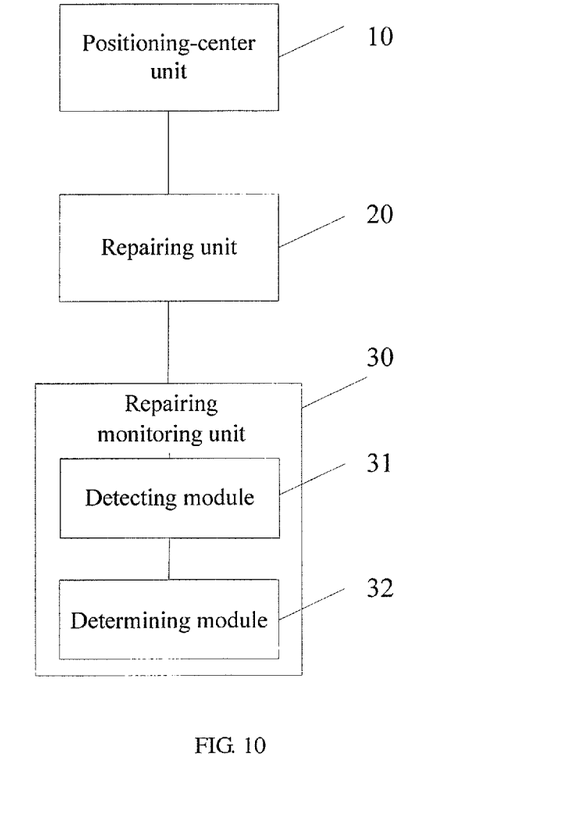
FIG. 10 is a constitute block diagram of a repairing monitoring unit provided by the second embodiment of the present invention.

Alternatively, after the repairing is completed, a repairing result needs to be monitored, so the system further comprises a repairing monitoring unit 30, whose constitute block diagram is shown in FIG. 10, for monitoring the repairing result, including:

a detecting module 31, for detecting the defective pixel respectively before and after the defective pixel is repaired to obtain a preset brightness and a repaired brightness.

A determining module 19, for determining a repairing effect according to the preset brightness and the repaired brightness.

Exemplarily, the determining module 32 determines the repairing as successful, when a difference between the preset brightness and the repaired brightness is less than a determination threshold; and the procedure returns to the repairing unit, when the difference between the preset brightness and the repaired brightness is greater than the determination threshold, and the repairing unit repairs the defective pixel according to the center coordinate again.

Figure 11:
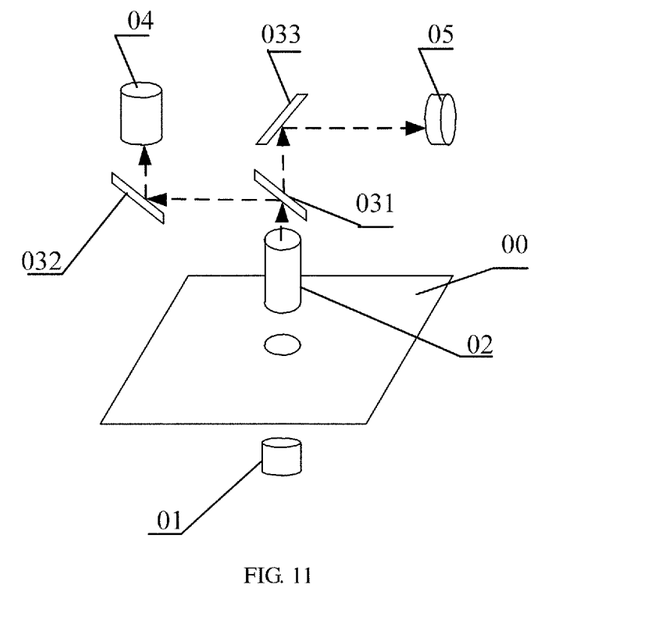
FIG. 11 is a structural block diagram of a detecting module provided by the second embodiment of the present invention.

Exemplarily, a constitute structure of the detecting module 31 is shown in FIG. 11, including: a light emitting unit 01, a light reflecting module 02, a prism group, a camera 04 and a photosensitive module 05; the light emitting unit 01 being located below a display panel 00, for emitting light with a preset brightness to the display panel 00; the light reflecting module 02 being located above the display panel 00, for reflecting light that passes through the display panel 00 to the prism group, the light reflected by the prism group being separated into two paths, one being reflected to the camera 04 to capture an image, and the other being reflected onto the photosensitive module 05; wherein the photosensitive module 05 detects the defective pixel region according to the reflected light before the repairing, to obtain the preset brightness, and detects the brightness of the repaired defective pixel again after the defective pixel is repaired, in a case where the unrepaired pixel is shielded, to obtain the repaired brightness.

Here, a dotted line in FIG. 11 represents a light path of the laser, and a position and an angle of each of the prisms in the prism group is set according to actual needs. The prism group provided in FIG. 13 according to the embodiment includes three prisms, wherein a first prism 031 mainly plays a role in receiving the laser reflected by the light reflecting module 02, the laser being divided into two beams by reflection and refraction, one travelling in a horizontal direction and then through a second prism 032, so that the camera located above it captures the image; the other obtained after refraction by the first prism 031 travelling in a vertical direction and then reflected by a third prism 033, so that the photosensitive module located in the horizontal direction thereof can measure the brightness of the light.

When the defective pixel is positioned, the light emitting unit 01 is turned on and the light reflecting module 02 is turned off, then the light emitting unit 01 is equivalent to a backlight, and light, after passing through the defective pixel, can exhibit corresponding colors, for example, red, green or blue, etc., whereas a region shielded by the black matrix is black, so a center of the defective pixel may be easily positioned according to gray-scale values of the defective pixel. Before the repairing, the light emitting unit 01 and the light reflecting module 02 are turned on, and the brightness of the defective pixel region is detected by the photosensitive module 05, to obtain the preset brightness S. After the defective pixel is repaired, the unrepaired pixel is shielded, while light generated by the light emitting unit 01 is reflected to the prism group, and thereafter one path of light is reflected to the photosensitive module 05, which may detect the brightness of the repaired defective pixel according to the reflected light, in a case where the unrepaired pixel is shielded, to obtain the repaired brightness SA, and then the determining module may determine the repairing effect according to a difference between the repaired brightness SA and the preset brightness S, i.e., if S−SA≥d, it determines the repairing as qualified, and if S−SA<d, it determines the repairing as unqualified, where d is a determination threshold.

Alternatively, the camera 04 according to the embodiment may be either a Charge-coupled Device (CCD) camera, or an image sensor.

With regard to the above-described system for repairing the defective pixel, the center coordinate of the defective pixel having a bright-dot on the display panel can be positioned, to achieve accurate positioning, and then the defective pixel is repaired according to the center coordinate obtained thereby, so as to replace the conventional manual alignment operation with the automatic positioning of the center coordinate, which not only accelerates repairing of the defective pixel, but also improves repairing efficiency, enhances overall efficiency and productivity of the apparatus, and meanwhile, can solve the problem of unsuccessful repairing due to error in manual operation; and the accuracy of the repairing can be improved by automatically positioning the center.

Further, the system provided by the embodiment also includes a photosensitive module, which may automatically adjust the brightness in the repairing process, and compare the brightness of the defective pixel region before and after the repairing, so as to confirm whether the repairing is qualified or not. The system can not only repair the defective pixel, but also monitor the repairing result, so as to enhance productivity.

A Third Embodiment

The third embodiment of the present invention further provides a display panel, which is the display panel obtained by the repairing based on the method for repairing a defective pixel provided by the first embodiment.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201310700535.5 filed on Dec. 18, 2013, the disclosure of which is incorporated herein by reference in its entirety as part of the present application.

What is claimed is:

1. A repairing method for a defective pixel, comprising:
positioning a center of the defective pixel to obtain a center coordinate of the defective pixel; and
repairing the defective pixel according to the center coordinate;
before the positioning a center of the defective pixel to obtain the center coordinate of the defective pixel, positioning the defective pixel to obtain a pixel coordinate of the defective pixel,
wherein the pixel coordinate and the center coordinate do not coincide;
the center coordinate is located on a center point of the defective pixel;
the pixel coordinate is a pixel coordinate of one point which is different from the center point in the pixel region where the defective pixel is located;
wherein the positioning a center of the defective pixel to obtain a center coordinate of the defective pixel, comprises:
performing a scanning respectively in four directions, with the pixel coordinate as a center, including:

in direction of upward, until an upper edge of the defective pixel are scanned, and obtaining an upper edge coordinate;

in direction of downward, until an lower edge of the defective pixel are scanned, and obtaining an lower edge coordinate;

in direction of leftward, until an left edge of the defective pixel are scanned, and obtaining an left edge coordinate;

in direction of rightward, until an right edge of the defective pixel are scanned, and obtaining an right edge coordinate;

calculating a vertical coordinate of the center coordinate according to the upper edge coordinate and the lower edge coordinate, and calculating a horizontal coordinate of the center coordinate according to the left edge coordinate and the right edge coordinate, so as to obtain the center coordinate;

wherein the obtaining an upper edge coordinate, a lower edge coordinate, a left edge coordinate and a right edge coordinate, comprises:

performing the scanning, from the pixel coordinate, respectively in the four directions of upward, downward, leftward and rightward, and then determining, when gray-scale values corresponding to coordinates change, the coordinates as the upper edge coordinate, the lower edge coordinate, the left edge coordinate and the right edge coordinate.

2. The repairing method according to claim 1, further comprising:

detecting brightness of the defective pixel, before repairing the defective pixel, to obtain a preset brightness;

shielding an unrepaired pixel and detecting brightness of the repaired defective pixel, to obtain a repaired brightness, after the defective pixel is repaired; and determining a repairing effect according to the preset brightness and the repaired brightness.

3. The repairing method according to claim 2, wherein the determining a repairing effect according to the preset brightness and the repaired brightness, comprises:

determining the repairing as successful, when a difference between the preset brightness and the repaired brightness is less than a determination threshold; otherwise, performing the repairing of the defective pixel according to the center coordinate again.

4. The repairing method according to claim 1, wherein the repairing the defective pixel according to the center coordinate, comprises: aligning a laser to the center coordinate of the defective pixel, crushing and diffusing a surrounding black matrix, so as to repair the defective pixel.

5. A system for repairing a defective pixel, comprising:

a positioning-center unit, configured to position a center of the defective pixel to obtain a center coordinate of the defective pixel; and a repairing unit, configured to repair the defective pixel according to the center coordinate;

wherein the positioning-center unit comprises:

a first positioning unit, configured to position the defective pixel to obtain a pixel coordinate of the defective pixel; and a second positioning unit, configured to position the center of the defective pixel based on the pixel coordinate, to obtain the center coordinate of the defective pixel, wherein the pixel coordinate and the center coordinate do not coincide;

the center coordinate is located on a center point of the defective pixel;

the pixel coordinate is a pixel coordinate of one point which is different from the center point in the pixel region where the defective pixel is located;

wherein the second positioning unit comprises:

an edge determining unit, configured to scan respectively in four directions, with the pixel coordinate as a center, including:

in direction of upward, until an upper edge of the defective pixel are scanned, and obtaining an upper edge coordinate;

in direction of downward, until an lower edge of the defective pixel are scanned, and obtaining an lower edge coordinate;

in direction of leftward, until an left edge of the defective pixel are scanned, and obtaining an left edge coordinate;

in direction of rightward, until an right edge of the defective pixel are scanned, and obtaining an right edge coordinate;

and a center determining unit, configured to calculate a vertical coordinate of the center coordinate according to the upper edge coordinate and the lower edge coordinate, and calculate a horizontal coordinate of the center coordinate according to the left edge coordinate and the right edge coordinate, so as to obtain the center coordinate;

wherein the edge determining unit scans, from the pixel coordinate, respectively in four directions of upward, downward, leftward and rightward, and then determining, when gray-scale values corresponding to coordinates changes, the coordinates respectively as the upper edge coordinate, the lower edge coordinate, the left edge coordinate and the right edge coordinate.

6. The system according to claim 5, further comprising:

a repairing monitoring unit, configured to monitor a repairing result, comprising:

a detecting module, configured to detect a preset brightness and a repaired brightness of a defective pixel region before and after the defective pixel is repaired; and a determining module, configured to determine a repairing effect according to the preset brightness and the repaired brightness.

7. The system according to claim 6, wherein the detecting module comprises: a light emitting unit, a light reflecting module, a prism group, a camera and a photosensitive module; the light emitting unit is located below a display panel and is configured to emit light with the preset brightness to the display panel; the light reflecting module is located above the display panel and is configured to reflect light that passes through the display panel to the prism group, the light reflected by the prism group is separated into two, one being reflected to the camera to capture an image and the other being reflected onto the photosensitive module; the photosensitive module detects the defective pixel region according to the reflected light before the repairing, to obtain the preset brightness, and detects the brightness of the repaired defective pixel again after the defective pixel is repaired under a condition that an unrepaired pixel is shielded, to obtain the repaired brightness.

8. The system according to claim 6, wherein the determining module determines the repairing as successful, when a difference between the preset brightness and the repaired brightness is less than a determination threshold; and the determining module determines the repairing as unsuccessful, when the difference between the preset brightness and the repaired brightness is greater than the determination threshold, then the repairing unit repairs the defective pixel according to the center coordinate again.

9. A display panel, which is the display panel obtained by the repairing with the method for repairing a defective pixel according to claim 1.

* * * * *